United States Patent
Cesareo et al.

(10) Patent No.: US 12,329,214 B2
(45) Date of Patent: *Jun. 17, 2025

(54) TEXTILE ARTICLE COMPRISING GRAPHENE AND FILTERS COMPRISING SAID TEXTILE ARTICLE

(71) Applicant: DIRECTA PLUS S.P.A., Lomazzo (IT)

(72) Inventors: Giulio Giuseppe Cesareo, Milan (IT); Laura Giorgia Rizzi, Saronno (IT)

(73) Assignee: Directa Plus S.p.A., Lomazzo (IT)

(*) Notice: Subject to any disclaimer, the term of this patent is extended or adjusted under 35 U.S.C. 154(b) by 127 days.

This patent is subject to a terminal disclaimer.

(21) Appl. No.: 17/927,768

(22) PCT Filed: May 24, 2021

(86) PCT No.: PCT/EP2021/063754
§ 371 (c)(1),
(2) Date: Nov. 25, 2022

(87) PCT Pub. No.: WO2021/239659
PCT Pub. Date: Dec. 2, 2021

(65) Prior Publication Data
US 2023/0225430 A1   Jul. 20, 2023

(30) Foreign Application Priority Data
May 25, 2020   (IT) .................. 102020000012262

(51) Int. Cl.
*A41D 13/11* (2006.01)
*B01D 39/08* (2006.01)
(Continued)

(52) U.S. Cl.
CPC ............ *A41D 13/11* (2013.01); *B01D 39/083* (2013.01); *B01D 39/1623* (2013.01);
(Continued)

(58) Field of Classification Search
CPC ....... C01B 32/15; C01B 32/182; C01B 32/00; B01D 39/083; B01D 39/1623;
(Continued)

(56) References Cited

U.S. PATENT DOCUMENTS 10,315,155 B2    6/2019   Chu et al.
2017/0190583 A1*  7/2017   Cesareo ................ C01B 32/19
(Continued)

FOREIGN PATENT DOCUMENTS

CN     110341251 A  * 10/2019 ........... A61K 8/0212
EP       2755747 A1     7/2014
(Continued)

OTHER PUBLICATIONS

Machine Translation of CN110341251 (Year: 2019).*
(Continued)

*Primary Examiner* — Jennifer A Steele
(74) *Attorney, Agent, or Firm* — Patterson Intellectual Property Law, PC

(57) ABSTRACT

Textile article comprising a textile substrate to which graphene is applied in an amount from 0.5 to 20 g of graphene per square meter of textile substrate, wherein said graphene is dispersed in a polymeric binder and forms a thermal circuit heatable by exposure to electromagnetic radiation. There is also described a filter comprising said textile article, for example a face mask for personal health protection.

20 Claims, 1 Drawing Sheet

(51) Int. Cl.
| | |
|---|---|
| *B01D 39/16* | (2006.01) |
| *B01D 39/20* | (2006.01) |
| *B01D 71/02* | (2006.01) |
| *B82Y 30/00* | (2011.01) |
| *D06B 3/18* | (2006.01) |
| *D06M 11/74* | (2006.01) |
| *D06M 16/00* | (2006.01) |
| *D06M 101/06* | (2006.01) |
| *D06M 101/20* | (2006.01) |
| *D06M 101/32* | (2006.01) |
| *D06M 101/38* | (2006.01) |

(52) U.S. Cl.
CPC ...... *B01D 39/2058* (2013.01); *B01D 71/0211* (2022.08); *B82Y 30/00* (2013.01); *D06B 3/18* (2013.01); *D06M 11/74* (2013.01); *D06M 16/00* (2013.01); *B01D 2239/0241* (2013.01); *B01D 2239/0258* (2013.01); *B01D 2239/0442* (2013.01); *B01D 2239/0464* (2013.01); *B01D 2239/0618* (2013.01); *B01D 2239/0627* (2013.01); *B01D 2239/10* (2013.01); *D06M 2101/06* (2013.01); *D06M 2101/20* (2013.01); *D06M 2101/32* (2013.01); *D06M 2101/38* (2013.01); *D06M 2200/00* (2013.01)

(58) Field of Classification Search
CPC ............ B01D 39/2058; B01D 71/0211; B01D 2239/0241; B01D 2239/0258; B01D 2239/0442; B01D 2239/0464; B01D 2239/0618; B01D 2239/0627; B01D 2239/10; B01D 39/08
See application file for complete search history.

(56) References Cited

U.S. PATENT DOCUMENTS

2021/0307428 A1* 10/2021 Zhamu ............... B01D 39/1615
2023/0243089 A1* 8/2023 Cesareo ................. B01D 39/08
427/359

FOREIGN PATENT DOCUMENTS

| EP | 3281695 A1 | 2/2018 |
| GB | 2572800 A | 10/2019 |
| KR | 20170055443 A | 5/2017 |
| KR | 1020170055443 A | 5/2017 |
| WO | 2015193267 A1 | 12/2015 |
| WO | 2019202028 A1 | 10/2019 |

OTHER PUBLICATIONS

International Searching Authority: European Patent Office Search Report for corresponding PCT/ EP2021/063754 dated Sep. 13, 2021, 6 pages.

* cited by examiner

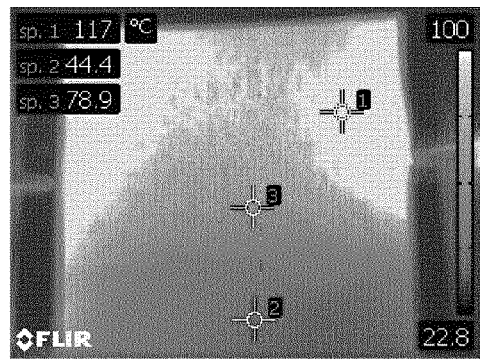
Fig. 1
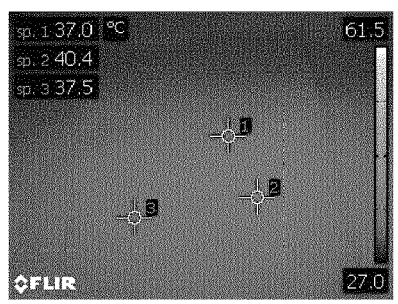
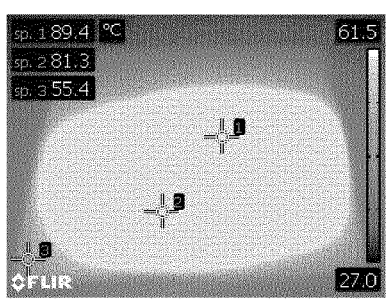
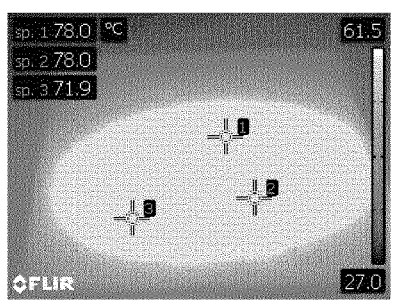
Fig. 2	Fig. 3	Fig. 4
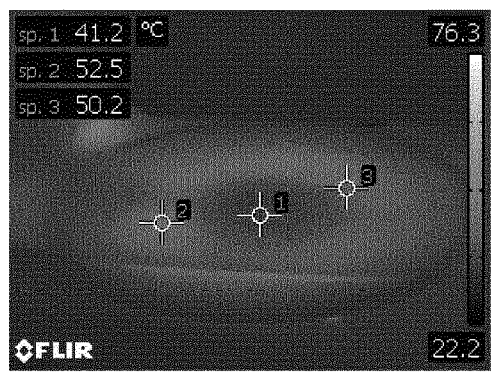
Fig. 5	Fig. 6

TEXTILE ARTICLE COMPRISING GRAPHENE AND FILTERS COMPRISING SAID TEXTILE ARTICLE

The present invention relates to a textile article comprising graphene for producing filters, and to the filters comprising this textile article.

BACKGROUND OF THE INVENTION

There are known filters having filtering characteristics in relation to dusts, fumes and inhalable liquid mists (aerosols), and possibly also in relation to pathogenic microorganisms, such as bacteria, fungi and viruses. Examples of these filters are filters for domestic or industrial use, such as the filters used in air conditioning systems or used in exhaust hoods, both industrial and those for domestic kitchens. Other examples of filters are those designed for personal health protection, such as face masks and the like.

With regard to face masks, these can be divided into specific protection classes, depending on their characteristics and the performance they provide, and can be both of disposable and reusable type. Moreover, there are known reusable face masks that can be subjected to sanitizing treatments.

The recent Covid-19 pandemic has determined an increase in research activities for new types of face masks, both having characteristics such as to fall within the protection classes established by current legislation (defined "personal protective equipment" or "PPE") and masks without these characteristics, but which are in any case able to ensure a high level of protection in relation to atmospheric particulate and/or pathogens. This latter type includes, for example, surgical masks.

EP 3 281 695 A1 discloses a filtration device comprising an active layer and an antimicrobial composite. The active layer comprises graphene or graphene oxide with attached functional groups. The antimicrobial composite comprises metallic silver and metallic ruthenium. Concerning the active layer, graphene is mentioned but no specific chemical or physical features are described. Graphene oxide and functionalized graphene oxide ("GOX") are actually taught.

GB 2 572 800 A1 discloses a breathing mask with a filter portion comprising a synthetic matrix comprising at least one of activated carbon, silver, silver ions and/or graphene. No specific features—either chemical or physical—of this graphene are described.

There is therefore the need for new materials for producing filters, both for civil or industrial use and for personal health protection, such as face masks and the like, that ensure a high filtering action, at least in relation to atmospheric particulate and/or pathogens, ensure sufficient breathability or respiratory efficacy, can be reused several times and, preferably, can be sanitized after one or more uses.

SUMMARY OF THE INVENTION

An object of the present invention is therefore to provide a filtering textile article that can be advantageously used in the production of filters for civil or industrial use and for personal health protection, such as face masks and the like.

Another object of the invention is to provide a filtering textile article that has antibacterial characteristics and causes a limited pressure drop in an air flow that passes through it.

Moreover, an object of the invention is to provide a textile article to be used in the production of a filtering manufactured product that can be sanitized once or several times after use.

Another object of the present invention is to provide a textile article with a high filtering power starting from a material with a much lower filtering power.

A further object of the present invention is to provide a filter product for personal health protection with a high filtering power and which can be sanitized once or several times after use.

Therefore, an aspect of the present invention concerns a filtering textile article comprising a textile substrate having a bacterial filtration efficiency of less than 80% according to UNI EN 14683:2019 Annex B, characterized by the fact that said textile article includes graphene in an amount from 0.5 to 20 g of graphene per square meter of textile substrate, wherein said graphene is dispersed in a polymeric binder and forms an electric and thermal circuit heatable by Joule effect through the use of an external battery or by exposure to electromagnetic radiation in the infrared or microwave region.

According to an aspect of the invention, said textile article has a bacterial filtration efficiency greater than 80% according to UNI EN 14683:2019 Annex B.

According to another aspect of the invention, said textile article determines a pressure drop, expressed as respiratory resistance, of less than 60 $Pa/cm^2$, measured according to UNI EN 14683:2019.

Another aspect of the present invention concerns a filter for personal health protection comprising a filtering textile article as defined above.

According to an aspect of the invention, the graphene contained in the textile article comprises graphene nano-platelets in which at least 90% have a lateral dimension (x, y) from 500 to 50000 nm and a thickness (z) from 0.34 to 50 nm.

According to a further aspect, the graphene contained in the textile article comprises graphene nano-platelets in which at least 90% has a lateral dimension (x, y) from 500 to 50000 nm and a thickness (z) from 0.34 to 50 nm, and wherein the C/O ratio is $\geq 100:1$.

Preferably, the textile article comprises graphene in an amount from 1 to 10 g of graphene per square meter of textile substrate, more preferably from 2 to 8 g of graphene per square meter of textile substrate.

According to the present invention, the term "textile substrate" is meant as a substantially flat substrate selected from the group consisting of fabrics, nonwovens, felts, films, polymer membranes and expanded foams, to which graphene has not yet been applied.

In the present description, the term "textile article" designates an article comprising a substantially flat textile substrate as described above, usable in the production of filters, including filters for personal health protection, to which graphene has been applied. The term also comprises the combination of one or more of said substrates.

With regard to the fabric, it can be made of natural, artificial or synthetic fiber. With regard to the nonwoven, the film or polymer membrane, the felts and the expanded foams, they are typically made with artificial fibers or synthetic resins.

BRIEF DESCRIPTION OF THE DRAWINGS

FIG. 1 is a thermogram of a textile article according to the invention heated by Joule effect;

FIG. 2 is a thermogram of a textile article of reference heated by IR radiation;

FIGS. 3 and 4 are thermograms of textile articles according to the invention heated by IR radiation; and FIGS. 5 and 6 are thermograms of textile articles according to the invention heated by microwaves.

DESCRIPTION OF THE INVENTION

The textile article according to the present invention comprises a textile substrate selected from fabrics, nonwovens, felts, films, polymer membranes and expanded foams, suitable for the production of a filtering manufactured product, including filters for personal health protection as they are provided with a certain filtering capacity and adapted to determine a relatively low pressure drop when a fluid, such as air, passes through them. Therefore, these filters are breathable and adapted to allow normal breathing when the textile article is destined, for example, for the production of a face mask.

According to the present invention, the textile substrate does not require to have high filtering characteristics in relation to dusts, fumes, aerosols or pathogenic microorganisms, as the filtering characteristics of the substrate are greatly increased by the application of graphene, and are thus present in the textile article obtained by applying graphene to the substrate.

Moreover, the increase of pressure drop is limited. The pressure drop through the textile article and/or the manufactured product in which it is incorporated is measured as lower respiratory resistance measured according to UNI EN 14683:2019.

According to the present invention it is thus possible to obtain a filtering textile article for producing filtering filters using a textile substrate selected from the group consisting of fabrics, nonwovens, felts, films, polymer membranes and expanded foams, having not particularly high filtering characteristics, defined by a bacterial filtration efficiency ("BFE") of less than 80% according to UNI EN 14683:2019, Annex B.

The application of a composition comprising graphene in an amount from 1 to 20 g/m$^2$ to these substrates having not particularly high filtering characteristics surprisingly gives the textile article thus obtained high filtering and antibacterial characteristics, defined by a bacterial filtration efficiency greater than 80%, measured according to the aforesaid method, while maintaining a respiratory resistance of less than 60 Pa/cm$^2$, measured according to UNI EN 14683:2019.

The graphene contained in the textile article, and in the manufactured product produced therewith, forms a thermal circuit capable of effectively absorbing and uniformly distributing the heat absorbed by this circuit. This characteristic allows the textile article to be heated by exposure to electromagnetic radiation, for example in the infrared, ultraviolet or microwave region. It is thus possible to sanitize the textile article, and the filtering manufactured product produced therewith, in a rapid and inexpensive manner simply by heating.

Moreover, the graphene also forms an electric circuit that allows dissipation of the static electricity accumulated on the textile article but also heating of the article by Joule effect by applying a voltage to the terminals of the circuit, if appropriately provided for.

In particular, the textile article has a surface resistivity of less than $2.5 \cdot 10^{12} \Omega$ measured according to JIS K 7194.

It must be borne in mind that the textile substrates defined above consist of insulating materials, i.e., have a surface resistivity greater than $2.5 \cdot 10^{12} \Omega$ measured according to JIS K 7194.

With regard to the material with which the textile substrate, and consequently the textile article, is made, it has been mentioned that the fabric can be made of natural, artificial or synthetic fiber, while the nonwoven, the film or polymer membrane, the felts and the expanded foams are typically made with artificial fibers or synthetic resins.

Useful natural fibers include, for example, wool, silk and cotton. Useful artificial fibers include modified or regenerated cellulose fibers, such as viscose and cellulose acetate. Useful synthetic fibers comprise polyamide, including aromatic polyamides (aramids), polyester, polyurethane, polyacrylonitrile, polycarbonate, polypropylene, polyvinyl chloride and their blends. Moreover, fabrics obtained from blends of natural, artificial and synthetic fibers can advantageously be used.

With regard to the type of textile substrate, the following substrates can be used.

Nonwovens:

The nonwovens used fall within the following categories:

Spunlace

This is a nonwoven deriving from a process called hydroentangling. The process uses high pressure water jets that perforate the fabric and intertwine the fibers giving the fabric greater substance. The consolidation of plies of fibers by means high pressure water jets causes these to perforate the fabric and intertwine the fibers without damaging them, as can occur with needle punching. Intertwining of the fibers in various directions gives the nonwoven an isotropic property and the same strength in various directions.

Spunbond

This is a nonwoven obtained by processing nonwoven synthetic fibers. The characteristic of this nonwoven is that of thermal point bonding the fibers. This characteristic mechanically bonds the fibers to one another and imparts the "point bonding" characteristic, which is usually square or oval and makes a fabric that is both soft and strong.

Felts

Another type of textile substrate that can be used is felt, consisting of synthetic fibers tangled and consolidated so as to form a compact structure using mechanical operations, as is known in the art.

Examples of Synthetic Felts are

100% polyester 500 g/m$^2$
100% polypropylene 450 g/m$^2$
100% polyester 350 g/m$^2$
100% polyester 340-380 g/m$^2$ Fabrics These are textile substrates obtained by weaving yarns on a loom, as is known in the art.

Other Textile Substrates

Expanded foams, breathable films and membranes, such as micro-perforated films and membranes, bonded nonwoven and fabric structures.

Graphene

As to graphene, it comprises, or consists of, graphene nano-platelets in which at least the 90% have a lateral dimension (x, y) from 50 to 50000 nm and a thickness (z) from 0.34 to 50 nm, and in which the C/O ratio is ≥100:1. Preferably, at least 90% of the graphene nano-platelets have a lateral dimension (x, y) from 100 to 10000 nm and a thickness (z) from 0.34 to 10 nm.

The scientific and patent literature describes various methods for the preparation of graphene, such as chemical vapor deposition, epitaxial growth, chemical exfoliation and chemical reduction of the oxidized form graphene oxide (GO).

The Applicant Directa Plus S.p.A. is the holder of patents and patent applications relating to production methods of structures comprising layers of graphene, such as EP 2 038 209 B 1, WO 2014/135455 A1 and WO 2015/193267 A1. The last two patent applications cited describe production methods of pristine graphene dispersions, from which it is possible to obtain graphene nano-platelets with the dimension required for implementation of the present invention, and with a C/O ratio ≥100:1. This ratio is important as it defines the maximum amount of oxygen bonded to the carbon forming the graphene. In fact, the best properties of graphene, which derive from its high crystallographic quality, are obtained when the amount of oxygen is minimum.

A pristine graphene, i.e., with a C/O ratio ≥100, and having the size characteristics defined previously, is produced and marketed by Directa Plus S.p.A. with the trade name G+®.

The C/O ratio in the graphene used in the textile article according to the invention is determined by means of elemental analysis performed by elemental analyzer (CHNS O), which provides the percentage by weight of the various elements. The C/O ratio is obtained by normalizing the values obtained with respect to the atomic weight of the C and O species and finding their ratio.

It was found that graphene in oxidized form, just as that in the form obtained through reduction of graphene oxide (GO), has different characteristics and properties to pristine graphene. For example, the electrical and thermal conductivity characteristics and the mechanical strength of pristine graphene are superior to those of GO and to the reduction product obtained therefrom, also due to the presence of numerous lattice defects and imperfections of the crystalline structure caused by the reduction reaction.

The lattice defects of the nano-platelets can be evaluated by Raman spectroscopy analyzing intensity and shape of the Peak D positioned at 1350 $cm^{-1}$.

According to preferred embodiments described in the patent documents mentioned above by the Applicant Directa Plus S.p.A., the continuous process for producing pristine graphene is carried out continuously feeding graphite flakes to the step of expansion at high temperature, continuously discharging the expanded graphite thus obtained in an aqueous medium and continuously subjecting the expanded graphite dispersed in the aqueous medium to exfoliation and size reduction treatment carried out with ultrasonication and/or high pressure homogenization methods.

As described in these patent documents, the final dispersion of graphene nano-platelets obtained can be concentrated or dried, according to the final form desired for the graphene.

The purpose of drying the dispersion is to obtain a dry powder that is easily re-dispersible in various matrices, both solvents and polymers, where liquid is not desirable or manageable at process level, or where water cannot be used due to chemical incompatibility.

A significant advantage of the production processes described in the patent documents WO 2014/135455 A1 and WO 2015/193267 A1 consists in the possibility of operating without using surfactants. In fact, the graphene nano-platelets thus obtained are pristine, both due to the high C/O ratio and to the absence of extraneous substances, such as surfactants, which could contaminate them. In fact, it was found that in the absence of surfactants it is possible to obtain graphene having an electrical conductivity substantially higher than that of graphene obtained with processes using surfactants. This improves the performance of graphene in a plurality of applications.

Pristine graphene nano-platelets, at least 90% of which have a lateral dimension (x, y) from 50 to 50000 nm and a thickness (z) from 0.34 to 50 nm, with a C/O ratio ≥100:1, have a high electrical conductivity. It was also seen that when a dispersion of graphene nano-platelets is formed in the presence of a surfactant, this deposits on the surface thereof and tends to promote its tangling.

In the present description the dimensions of the graphene nano-platelets are defined with reference to a system of Cartesian axes x, y, z, it being understood that the particles are substantially flat platelets but can also have an irregular shape. In any case, the lateral dimension and the thickness provided with reference to the directions x, y and z are meant as the maximum dimensions in each of the aforesaid directions.

The lateral dimensions (x, y) of the graphene nano-platelets are determined, within the scope of the production process described above, by direct measurement on the scanning electron microscope (SEM), after having diluted the final dispersion in a ratio of 1:1000 in deionized water and having added it dropwise to a silicon oxide substrate placed on a plate heated to 100° C.

Alternatively, if nano-platelets in dry state are available, SEM analysis is carried out directly on the powder deposited on a double-sided adhesive carbon tape.

In both cases the measurement is carried out on at least 100 nano-platelets.

The thickness (z) of the graphene nano-platelets is determined with the atomic force microscope (AFM), which is essentially a profilometer with subnanometer resolution, widely used for the characterization (mainly morphological) of surfaces and of nanomaterials. This type of analysis is commonly used to evaluate the thickness of graphene flakes, produced using any method, and thus find the number of layers of which the flake is composed (single layer=0.34 nm).

The thickness (z) can be measured using a dispersion of nano-platelets diluted in a ratio of 1:1000 in isopropanol, from which 20 ml is collected and sonicated in an ultrasonic bath (Elmasonic S40) for 5 minutes. The nano-platelets are then deposited as described for SEM analysis and are scanned directly with an AFM tip, where the measurement provides a topographical image of the graphene flakes and their profile with respect to the substrate, enabling precise measurement of the thickness. The measurement is carried out on at least 50 nano-platelets.

Alternatively, if nano-platelets in dry state are available, the powder is dispersed in isopropanol at a concentration of 2 mg/L. An amount of 20 ml is collected and sonicated in an ultrasonic bath (Elmasonic S40) for 30 minutes. The nano-platelets are then deposited as described for SEM analysis and are scanned by AFM.

In the concentrated final dispersion or in the dry form obtained after drying, at least 90% of the graphene nano-platelets preferably have a lateral dimension (x, y) from 50 to 50000 nm and a thickness (Z) from 0.34 to 50 nm, and a C/O ratio ≥100:1. Preferably, at least 90% of the graphene nano-platelets have a lateral dimension (x, y) from 100 to 10000 nm and a thickness (z) from 0.34 to 10 nm, more preferably a lateral dimension (x, y) from 200 to 8000 nm, and even more preferably from 500 to 5000 nm, and preferably a thickness (z) from 0.34 to 8 nm, more preferably from 0.34 to 5 nm.

The graphene nano-platelets, hereinafter also referred to as GNPs, having the aforesaid characteristics of dimension and purity, thus having a very low oxygen content, as defined by the aforesaid C/O ratio and not functionalized with other molecules, proved to be particularly suitable for application to a textile substrate to obtain a textile article having excellent filtering and antibacterial properties. Moreover, the graphene uniformly distributed on the textile article forms a thermal circuit capable of optimally managing the heat absorbed by the circuit. In particular, the following properties are noted:
- a) High absorption of microwaves or other electromagnetic radiation such as UV and infrared causes an increase in the temperature of the textile article containing graphene exposed to this radiation to kill viruses and bacteria.
- b) Absorption of infrared radiation of around 90% of the incident radiation with wavelength ranging from 380 to 2500
- c) Thermal conductivity in the order of several W/mK. It should be considered that the thermal conductivity of a metal is generally >20 W/mK, while that of insulating polymers is generally <0.1 W/mK.
- d) Electrical conductivity: surface resistivity in the order of $10^{-1}$-$10^{12}\Omega$, i.e., the circuit ranges from highly antistatic to good conductor.
- e) The good or high electrical conductivity of the textile article containing graphene is useful to dissipate the electrostatic energy accumulated, but also to heat it through the Joule effect by applying a voltage to the terminals of the circuit, if appropriately provided for.

Methods of Applying the Graphene to the Textile Substrate

Various methods can be used to apply the graphene to the textile substrate, such as full coating of the substrate, impregnation of the substrate and spray coating of the substrate.

Full Coating

GNPs are dispersed in a printing paste with tools that utilize high shear stresses to obtain a homogeneous dispersion.

According to an embodiment, an amount of GNPs from 1% to 20% by weight is added to a polyurethane based printing paste.

Preferably, the graphene is present in an amount from 1.5 to 10% by weight with respect to the total weight of the composition, more preferably from 2 to 6% by weight.

The composition comprising graphene used for application to the textile substrate of the invention is preferably in liquid or paste form, where the liquid is preferably water or a blend of water with other solvents and/or dispersants.

In an embodiment the composition comprises:
- a1) from 10 to 40% by weight of a polymeric binder,
- a2) from 1 to 15% by weight of a compatibilizing solvent for said polymeric binder,
- a2) from 1 to 8% by weight of a thickener,
- a3) from 1 to 20% by weight of graphene consisting of graphene nano-platelets, wherein at least 90% have a lateral dimension (x, y) from 100 to 10000 nm and a thickness (z) from 0.34 to 10 nm, and wherein the C/O ratio is ≥100:1;
- a4) from 17 to 86% by weight of water;

The viscosity of the composition is in the range from 4000 to 30000 cPs and is mainly regulated by adjusting the amount of thickener in the range 1-8% by weight.

The viscosity is measured with a Fungilab series Viscolead PRO rotational viscometer, R6 spindle, speed 10 rpm, measurement at T=20° C.

The viscosity of the composition is preferably in the range from 10000 to 20000 cPs.

The composition preferably also contains a dispersant and an anti-foaming agent. The sum of these two components in the composition varies from 0.1 to 2% by weight.

In a preferred embodiment the composition comprises:
- a1) from 10 to 30% by weight of a polymeric binder,
- a2) from 3 to 10% by weight of a compatibilizing solvent for said polymeric binder,
- a3) from 2 to 5% by weight of a thickener,
- a4) from 2 to 15% by weight of graphene consisting of graphene nano-platelets, wherein at least 90% have a lateral dimension (x, y) from 100 to 10000 nm and a thickness (z) from 0.34 to 10 nm, and wherein the C/O ratio is ≥100:1;
- a5) from 40 to 83% by weight of water.

Preferably the polymeric binder a1) is selected from the group consisting of polyurethanes, polyacrylates, polybutadiene, copolymers of acrylic acid. Among the polyurethanes, anionic polyurethanes are preferred, for example obtainable through reaction of one of more diisocyanates, preferably aliphatic or cycloaliphatic diisocyanates, with one or more polyester diols, and preferably one or more hydroxy carboxylic acids, for example hydroxy acetic acid, or preferably dihydroxy carboxylic acids. A preferred binder is a polyester based aliphatic polyurethane formulated with isocyanate crosslinker.

Preferably the compatibilizing solvent a2) for the polymeric binder is ethylene or propylene glycol.

The thickener) can be a natural or synthetic thickener.

Examples of inorganic natural thickeners are laminar silicates such as bentonite. Examples of organic natural thickeners are proteins such as casein or polysaccharides. Natural thickeners chosen from agar agar, gum arabic and alginates are particularly preferred.

Examples of synthetic thickeners are generally liquid solutions of synthetic polymers, in particular polyacrylates.

Preferably, the graphene a4) consists of graphene nano-platelets, at least 90% of which have a lateral dimension (x, y) from 50 to 50000 nm, a thickness (z) from 0.34 to 50 and a C/O ratio ≥100:1. Preferably, at least 90% of the graphene nano-platelets have a lateral dimension (x, y) from 100 to 10000 nm and a thickness (z) from 0.34 to 10 nm, more preferably a lateral dimension (x, y) from 200 to 8000 nm, even more preferably from 500 to 5000 nm, and even more preferably a thickness (z) from 0.34 to 8 nm, more preferably from 0.34 to 5 nm.

Preferably the dispersant is chosen from naphthalene sulfonate, polyethylene glycol (PEG) and polyvinylpyrrolidone (PVP).

Preferably, the antifoaming agent is chosen from silicone-based defoamers, alkoxylated fatty alcohols and alkyl esters of fatty acids of $C_8$-$C_{20}$.

The preparation process of the textile article according to the invention comprises the steps of:
- (A) Preparing a composition comprising the components a1)-a5) as mentioned above, and adjusting the viscosity of the composition in the range from 4000 to 30000 cPs;
- (B) Applying said composition to a flat textile article with the method of flat or rotary screen printing. In flat screen printing, the paste is spread with a blade over a screen etched with holes. The printing paste is forced through the holes and deposits on the textile substrate underneath the screen.

(C) The textile substrate to which the printing paste containing graphene is applied is polymerized in the oven at 150° C. for around 3 minutes.

The process that uses rotary screen printing is the same, but is performed on a larger scale. In fact, cylinders inside which the printing paste is forced are used in place of frames. The textile substrate to be treated is fed under the cylinder on a conveyor belt. After printing, the textile article is fed through the oven for the polymerization step (150° C., 3 minutes).

Preparation of the step (A) is preferably carried out by placing the polymeric binder a1) pre-dispersed in water in a receptacle stirred with a rotating blade stirrer, into which the graphene, the compatibilizing agent of the binder and the dispersant are then added. The composition is stirred until a uniform dispersion is obtained. Typically, stirring is conducted at a rotation speed of the stirrer between 1000 and 2500 rpm for a time ranging from 1 to 2 hours.

In the step (C) the fabric is fed into an oven and heated to a temperature ranging from 120 to 180° C. for a time ranging from 1 to 10 minutes. The heat treatment causes evaporation of the liquid and completes polymerization of the polymeric binder and/or cross-linking of its components, hardening the composition.

The textile article thus obtained can then advantageously be used to produce filters.

Impregnation

This method consists in impregnation of the textile substrate in a bath containing graphene in the form of dispersed GNPs. The method allows the GNPs to be deposited not only on the surface of the textile substrate but also between the inner fibers.

In an embodiment, the GNP dispersion is composed as follows: 82% water; 13.5% GNPs; 4.5% polymeric binder. Hereinafter, this dispersion is called "Grafypad".

The method uses a water-based impregnation bath comprising:

10 g/l-300 g/l of Grafypad 10 g/l-300 g/l of polymeric binder in a Grafypad/polymeric binder ratio ranging from 1:1 to 1:3, where the polymeric binder is an emulsion of acrylic polymers to which surfactants and cross-linking agents, typically used for pigment dyeing of cellulose, synthetic and blended fabrics, are added;

1 g/l-30 g/l of an anti-migration agent consisting of a polyfunctional amide derivative, in a ratio of 10% by weight with respect to the Grafypad.

Application consists in immersing the textile substrate in an impregnation tank. The fabrics are moved using rollers. After impregnation, the fabric is passed between two rubber coated rollers to eliminate the excess liquid. Subsequently, the fabric is fed through the oven at 150° C. for 3 minutes for polymerization of the binder. If necessary, a further impregnation step is carried out in a bath of water containing 10 g/l-300 g/l of polymeric binder, for example 200 g/L of acrylic binder Achifix MBH Conc, to increase the rubbing resistance of the graphene. It is then fed through the oven again at 150° C. for 3 minutes.

Spray Coating

The method consists in spraying a dispersion of graphene and polymeric binder onto the fabric to obtain a light and uniform coating.

Incorporation of Graphene in a Polymer Membrane and Micro-Perforation Thereof

The material is composed as follows: inner fabric layer of polyamide or elasticated polyamide; intermediate layer composed of a micro-perforated membrane containing graphene, outer fabric layer of any polyamide.

The process used to create a micro-perforated membrane starts from blending of the following ingredients:

Polyurethane resin

Graphene in a percentage range from 1 to 30% by weight with respect to total weight of the film.

A composition of polyurethane resin containing graphene suitable to obtain a micro-perforated membrane according to the present invention, and its preparation process, are described in the patent application WO 2018/202747 A1 by the same Applicant.

During the production process of a membrane as described in WO 2018/202747 A1 a degassing step is carried out to prevent the presence of bubbles in the material. In the present example, to create a micro-perforated membrane, degassing is not carried out precisely for the purpose of obtaining bubbles, which explode during heat treatment in the oven and leave voids. These voids, of variable dimension from 10 to 50 micrometers, are in fact holes in the membrane that allow air to pass through it. Moreover, once the membrane has been deposited on the fabric, the latter is stretched to 100% to promote formation of the holes.

Once the micro-perforated membrane has been obtained, different fabrics can be laminated on the two faces. Hereinafter, the membrane laminated with a single fabric will be referred to as two-layer, while the membrane laminated with two fabrics, one per side, will be referred to as three-layer.

Incorporation of Graphene in a Multilayer Textile Substrate

Graphene in the form of GNPs is deposited on a multilayer textile substrate, for example composed of two layers of bicomponent spunbond nonwoven (i.e., consisting of bicomponent fibers with polypropylene interior and polyethylene outer shell). The process provides for deposition of the material, in dry powder form, on a layer of spunbond nonwoven. A further layer of spunbond is then laid on top of this. The multilayer is subsequently hot calendered to weld the two layers of nonwoven and incorporate the GNPs inside them.

The same process can be concluded by pre-dispersing the graphene in water in order to facilitate dispersion of the material on the nonwoven. Water is used as medium to improve handling. During the hot calendering step, the water evaporates leaving the filler unchanged.

As indicated also by the following examples, the invention makes it possible to use textile substrates with normal or low antibacterial filtering efficiency in textile articles with high antibacterial filtering efficiency by the application of graphene in the amounts described. The pressure drop through the textile article thus obtained is limited, meaning that the article can be used effectively as filtering element, or can be used for the manufacture of filters. In the case of filters for personal health protection, such as face masks and the like, the manufactured product allows normal breathing.

Finally, the textile article, and the manufactured product produced therewith, can be sanitized by heating, both by absorption of electromagnetic radiation and by Joule effect.

The examples below illustrate some embodiments of the invention and are provided by way of non-limiting example.

EXAMPLES

Example 1

Full Coating Printing on Textile Substrate Made of Polyester (PES)
MATERIAL: 100% PES
WEIGHT: 120 g/m$^2$
THICKNESS: 190 mm The textile substrate is printed with the methods indicated above. The amount of printing paste containing GNPs deposited on the fabric is around 31 g/m$^2$. The printing paste used in this example is filled with GNPs to 14% by weight (percentage calculated dry, once the paste has polymerized). Consequently, the amount of GNPs on the material is 4.43 g/m$^2$. The textile articles thus obtained have the following characteristics, where "Ref" is used to indicate the same textile article but without graphene:

| Fabric PES 140 g/m$^2$ | Surface resistivity | 6.58 × 10$^4$ Ohm | Standard: JIS K 7194 |
|---|---|---|---|
| | Thermal conductivity range | 1-4 W/mK | Standard: ISO 22007-2 |
| | Respiratory resistance | Ref.: 11.9 Pa/cm$^2$ Inv.: 18.8 Pa/cm$^2$ | Standard: UNI EN 14683 (Chapter 5 Paragraph 2.3) |
| | Bacterial filtration (BFE) | Ref.: 71% Inv.: 96% | Standard: UNI EN 14683 Annex B (Chapter 5 Paragraph 2.2) |

Example 2

Full Coating Printing on Spunlace Nonwoven Textile Substrate 80 g/m$^2$
MATERIAL: 40% PP-60% VISCOSE
FILAMENT COUNT: 1.7 DTEX
WEIGHT: 80 g/m$^2$
TENACITY MD: 120 N/50 mm
TENACITY CD: 25 N/50 mm
ELONGATION AT BREAK MD: 50%
ELONGATION AT BREAK CD: 160%

The textile substrate is printed with the methods indicated above. The amount of printing paste containing GNPs deposited on the nonwoven is 29 g/m$^2$. The printing paste used is filled with GNPs to 14% wt. (percentage calculated dry, once the paste has polymerized). Consequently, the amount of GNPs on the printed material is 4.06 g/m$^2$. The textile articles thus obtained have the following characteristics:

| Spunlace 80 g/m$^2$ | Surface resistivity | 7.03 × 10$^4$ Ohm | Standard: JIS K 7194 |
|---|---|---|---|
| | Thermal conductivity range | 1-4 W/mK | Standard: ISO 22007-2 |
| | Antibacterial activity | *Staphylococcus Aureus*: 3.1 *Klebsiella Pneumoniae*: 3.7 | Standard: UNI EN ISO 20743:2013* |
| | Respiratory resistance | Ref.: 7 Pa/cm$^2$ Inv.: 17.7 Pa/cm2 | Standard: UNI EN Paragraph 2.3) 14683 (Chapter 5 |
| | Bacterial filtration (BFE) | Ref.: 73% Inv.: 95% | Standard: UNI EN 14683 Annex B (Chapter 5 Paragraph 2.2) |

*Antibacterial classes from UNI EN ISO 20743:2013

| ANTIBACTERIAL ACTIVITY VALUE according to ISO 20743:2013 | |
|---|---|
| from 0 to 1 | poor antibacterial efficacy |
| from 1 to 2 | slight bacteriostatic effect |
| from 2 to 3 | significant antibacterial efficacy |
| >3 | high antibacterial efficacy |

Example 3

Full Coating Printing on Spunlace Nonwoven Textile Substrate 200 g/m$^2$
MATERIAL: 100% Polyester
WEIGHT: 200 g/m$^2$ The textile substrate is printed with the methods indicated above. The amount of printing paste containing GNPs deposited on the nonwoven is 19 g/m$^2$. The printing paste used is filled with GNPs to 14% weight (percentage calculated dry, once the paste has polymerized). Consequently, the amount of GNPs on the printed material is 2.66 g/m$^2$. The textile articles thus obtained have the following characteristics:

| TNT 200 g/m$^2$ | Surface resistivity | 6.45 × 10$^4$ Ohm | Standard: JIS K 7194 |
|---|---|---|---|
| | Thermal conductivity range | 1-4 W/mK | Standard: ISO 22007-2 |
| | Respiratory resistance | Ref.: 5.65 Pa/cm$^2$ Inv.: 27 Pa/cm2 | Standard: UNI EN 14683 (Chapter 5 Paragraph 2.3) |
| | Bacterial filtration (BFE) | Ref.: 66% Inv.: 93% | Standard: UNI EN 14683 Annex B (Chapter 5 Paragraph 2.2) |

Example 4

Full Coating Printing on Multilayer Nonwoven:
Composition of the sandwich: polypropylene fiber+cellulose fiber (core)+polypropylene fiber.
Weight: 150 g/m2 (50+50+50).

The textile substrate is printed with the methods indicated above. The amount of printing paste containing GNPs deposited on the nonwoven is around 35 g/m$^2$. The printing paste used is filled with GNPs to 14% wt. (percentage calculated dry, once the paste has polymerized). Consequently, the amount of GNPs on the printed material is 4.9 g/m$^2$. The textile articles thus obtained have the following characteristics:

| | | | |
|---|---|---|---|
| Multilayer Nonwoven 150 g/m² | Surface resistivity | 6.2 × 10⁴ Ohm | Standard: JIS K 7194 |
| | Thermal conductivity range | 1-4 W/mK | Standard: ISO 22007-2 |
| | Respiratory resistance | Ref.: 6.2 Pa/cm² Inv.: 17.7 Pa/cm2 | Standard: UNI EN 14683 (Chapter 5 Paragraph 2.3) |
| | Bacterial filtration (BFE) | Ref.: 76% Inv.: 95% | UNI EN 14683:2019 Annex B (Chapter 5 Paragraph 2.2) |

Example 5

Fabric Impregnation

MATERIAL: 97% cotton; 3% polyurethane fiber
WEIGHT: 110 g/m²

The material is impregnated with the methods described above.

The impregnation bath is composed of:
Water
30 g/L Grafypad
30 g/L polymeric binder
3 g/L anti-migration agent An impregnation of 75 g/m² is obtained, which corresponds to 2.25 g/m² of Grafypad and consequently to around 0.30 g/m² of GNPs. Following impregnation with Grafypad a further impregnation step is carried out with a water bath containing 200 g/L of Achifix MBH CONC to improve rub fastness. The characteristics obtained through the impregnation treatment with GNPs are as follows:

| | | | |
|---|---|---|---|
| Cotton 110 g/m² | Surface resistivity | 3.35 × 10¹¹ Ohm | Standard: JIS K 7194 |
| | Thermal conductivity range | 1-4 W/mK | Standard: ISO 22007-2 |
| | Antibacterial activity* | *Staphylococcus Aureus*: 4.1 *Klebsiella Pneumoniae*: 6.3 | Standard: UNI EN ISO 20743:2013 |
| | Respiratory resistance | Ref.: 14.22 Pa/cm² Inv.: 16.67 Pa/cm² | Standard: UNI EN 14683 Annex B (Chapter 5 Paragraph 2.2) |
| | Bacterial filtration (BFE) Carried out by superimposing two layers | Ref.: 67% Inv.: 83% | UNI EN 14683: 2019 (Annex B) |

*The sample as is has poor antibacterial efficacy (*S. Aureus* = 0.6; *K. Pneumoniae* = 0.7)

Example 6

Impregnation of Multilayer Nonwoven

Composition of the sandwich: polypropylene fiber+cellulose fiber (core)+polypropylene fiber.

Weight: 150 g/m2 (50+50+50).

The material is impregnated with the methods described above.

The impregnation bath is composed of:
Water
30 g/L Grafypad
30 g/L polymeric binder
3 g/L anti-migration agent An impregnation of 95 g/m² is obtained, which corresponds to 2.85 g/m² of Grafypad and consequently to around 0.38 g/m² of GNPs. The characteristics obtained through the impregnation treatment with GNPs are as follows:

| Multilayer Nonwoven 150 g/m² | Surface resistivity | 2.83 × 10¹¹ Ohm | Standard: JIS K 7194 |
|---|---|---|---|
| | Thermal conductivity range | 1-4 W/mK | Standard: ISO 22007-2 |
| | Respiratory resistance | Ref.: 16.2 Pa/cm² Inv.: 30 Pa/cm2 | Standard: UNI EN 14683 (Chapter 5 Paragraph 2.3) |
| | Bacterial filtration (BFE) | Ref.: 76% Inv.: 94% | UNI EN 14683: 2019 (Annex B) |

Example 7

Spray Coating of a Cotton Fabric

Textile substrate: cotton fabric

Dispersion of GNPs at the concentration of 4% by weight of the polymeric binder Ruco-Pur X-SLR (Reactive polyether polyurethane, cationic, self-crosslinking polyurethane).

The dispersion is sprayed onto the fabric so as to apply an amount of dispersion of 55 g/m² and consequently of graphene of 2.2 g/m².

The textile article obtained had the following characteristics: Electrical conductivity: in the range $10^4$-$10^{10}$ Ohm/sq (JIS K 7194)
Bacteriostaticity (UNI EN ISO 20743:2013)

| Material | Treatment | Bacterial strain | Antibacterial activity value |
|---|---|---|---|
| Cotton fabric | Spray coating | *Klebsiella Pneumoniae* | 7.2 (high antibacterial effect) |
| | Spray coating | *Staphylococcus aureus* | 7.2 (high antibacterial effect) |

Example 8

Multilayer Textile Article with Micro-Perforated Membrane

The textile article is composed as follows: inner fabric layer of elasticated polyamide; intermediate layer composed of a micro-perforated membrane as described above, outer fabric layer of polyamide.

The process used to obtain a micro-perforated membrane was described above.

The following characterizations were carried out on this material:
  Surface resistivity on micro-perforated membrane: $10^{11}$ Ohm
  Size of the micro-perforations: 10-50 micrometers
  Air flow (UNI EN 14683 Chapter 5 Paragraph 2.3)
  Two-layer air flow: 9 Pa/cm²
  Three-layer air flow: 33 Pa/cm²
  Bacterial filtration (UNI EN 14683 Annex B, chapter 5 paragraph 2.2).
  Three-layer: 87%

Example 9

Multilayer Textile Article with Incorporation of Graphene Between the Layers

The textile substrate is composed of two layers of spunbond nonwoven between which graphene is applied in the amount of 40 g/m².
  Total weight 90 g/m².
  Air permeability 60 l/mss;
  Thickness: 0.46 mm;

The following characterizations were carried out on this material:
  Pressure drop at 5 cm/sec=100 mm.
  Surface resistivity: $4 \times 10^{-1}$ Ohm The textile article obtained, due to the high electrical conductivity and to the stratification of the materials, is particularly to be subjected to electrical heating by Joule effect.

Examples of Sanitizing Textile Articles Containing Graphene

The aim of the following examples is to take the textile article to a temperature of over 60° C. in order to eliminate or inactivate any microorganisms present on the article.

Example 10

Heating by Joule Effect

By applying a voltage of 3.5 V and a current of 5 A to a multilayer sample (nonwoven-graphene-nonwoven) of 100 cm² the sample is heated to a temperature of >80° C. Heating is homogeneous. The temperature reached allows the material to be sanitized through heat.

FIG. 1 shows a thermogram of the sample heated by Joule effect.

Example 11

Heating by Infrared Radiation (IR)

In this method a halogen filament lamp with a power of 100 W is used. The distance between sample and lamp is 10 cm, while the heating time is 10 minutes. Samples tested and results obtained:

| Sample | Treatment | T max (° C.) |
|---|---|---|
| Felt 350 g/m² | Sample without GNPs | 40 |
| | Full coating printing with GNPs | 89 |
| | Impregnation with GNPs | 78 |
| Spunbond nonwoven 30 g/m² | Sample without GNPs | 40 |
| | Full coating printing with GNPs | 84 |
| | Impregnation with GNPs | 54 |
| Polyester 140 g/m² | Sample without GNPs | 32 |
| | Full coating printing with GNPs | 75 |
| | Impregnation with GNPs | 74 |
| Three-layer with micro-perforated membrane | Sample without GNPs | 58 |
| | GNPs | 64 |
| Multilayer nonwoven | Sample without GNPs | 53 |
| | Full coating printing with GNPs | 80 |
| | Impregnation with GNPs | 73 |

FIGS. 2, 3 and 4 respectively show the sample of Felt 350 g/m² untreated (FIG. 2), treated with full coating printing (FIG. 3) and treated by impregnation (FIG. 4).

Example 12

Heating by Microwaves

The instrument used is a microwave oven with power set to 360 W. The heating time varies from 50 seconds to two minutes. The variability is given by the balance between obtaining homogeneous heating and melting of the sample. Samples Tested and Results Obtained:

| Sample | Treatment | T max (° C.) |
|---|---|---|
| Felt 350 g/m² | Sample without GNPs | 51 |
|  | Impregnation with GNPs | 86 |
| Spunbond | Sample without GNPs | 67 |
| nonwoven 30 g/m² | Impregnation with GNPs | 77 |
| Multilayer | Sample without GNPs | 52 |
| nonwoven | Impregnation with GNPs | 91 |

FIGS. 5 and 6 respectively show the sample of Felt 350 g/m² untreated (FIG. 5) and treated by impregnation (FIG. 6).

The invention claimed is:

1. A textile article comprising:
a textile substrate having a bacterial filtration efficiency of less than 80% prior to the application of graphene; and
a polymeric binder with graphene in an amount from 0.5 to 20 g of graphene per square meter of textile substrate for forming an electric and thermal circuit heatable by Joule effect with an external battery or by exposure to electromagnetic radiation in the infrared or microwave region,
wherein the graphene has a C/O ratio of >100:1 and is in the form of nano-platelets, and the textile article after application of graphene has a bacterial filtration efficiency greater than 80%.

2. The textile article of claim 1, comprising a respiratory resistance of less than 60 Pa/cm².

3. The textile article of claim 1, wherein the graphene comprises graphene nano-platelets in which at least 90% have a lateral dimension (x, y) from 500 to 50000 nm and a thickness (z) from 0.34 to 50 nm.

4. The textile article of claim 1, wherein the graphene is present in an amount from 1 to 10 g of graphene per square meter of textile substrate.

5. The textile article of claim 1, wherein the graphene is present in an amount from 2 to 8 g of graphene per square meter of textile substrate.

6. The textile article of claim 1, wherein the textile substrate is chosen from fabrics, nonwovens, felts, films, polymer membranes, expanded foams and combinations thereof.

7. A filter comprising a textile article, wherein the textile article further comprises:
a textile substrate having a bacterial filtration efficiency of less than 80% prior to the application of graphene; and
a polymeric binder with graphene in an amount from 0.5 to 20 g of graphene per square meter of textile substrate for forming an electric and thermal circuit heatable by Joule effect with an external battery or by exposure to electromagnetic radiation in the infrared or microwave region,
wherein the graphene has a C/O ratio of >100:1 and is in the form of nano-platelets, and the textile article after application of graphene has a bacterial filtration efficiency greater than 80%.

8. The filter of claim 7, wherein the textile article comprises a respiratory resistance of less than 60 Pa/cm².

9. The filter of claim 7, wherein the graphene comprises graphene nano-platelets in which at least 90% have a lateral dimension (x, y) from 500 to 50000 nm and a thickness (z) from 0.34 to 50 nm.

10. The filter of claim 7, wherein the graphene is present in an amount from 1 to 10 g of graphene per square meter of textile substrate.

11. The filter of claim 7, wherein the graphene is present in an amount from 2 to 8 g of graphene per square meter of textile substrate.

12. The filter of claim 7, wherein the textile substrate is chosen from fabrics, nonwovens, felts, films, polymer membranes, expanded foams and combinations thereof.

13. A face mask comprising:
a textile article comprising a textile substrate and graphene in an amount of 0.5 to 20 g of graphene per square meter of textile substrate, wherein said graphene is dispersed in a polymeric binder, wherein the graphene has a C/O ratio of >100:1 and is in the form of nano-platelets, and wherein said textile article has a bacterial filtration efficiency higher than 80% and a respiratory resistance lower than 60 Pa/cm².

14. The face mask of claim 13, wherein the graphene comprises graphene nano-platelets in which at least 90% have a lateral dimension (x, y) from 500 to 50000 nm and a thickness (z) from 0.34 to 50 nm.

15. The face mask of claim 13, wherein the graphene is present in an amount from 1 to 10 g of graphene per square meter of textile substrate.

16. The face mask of claim 13, wherein the graphene is present in an amount from 2 to 8 g of graphene per square meter of textile substrate.

17. The face mask of claim 13, wherein the textile substrate is chosen from fabrics, nonwovens, felts, films, polymer membranes, expanded foams and combinations thereof.

18. The face mask of claim 13, wherein the bacterial filtration efficiency greater than 80% is according to UNI EN 14683:2019 Annex B.

19. The textile article of claim 1, wherein the bacterial filtration efficiency greater than 80% is according to UNI EN 14683:2019 Annex B.

20. The filter of claim 7, wherein the bacterial filtration efficiency greater than 80% is according to UNI EN 14683: 2019 Annex B.

* * * * *